Oct. 11, 1955
G. KOSCHER ET AL
2,720,023
ICE SPUD
Filed Dec. 8, 1952
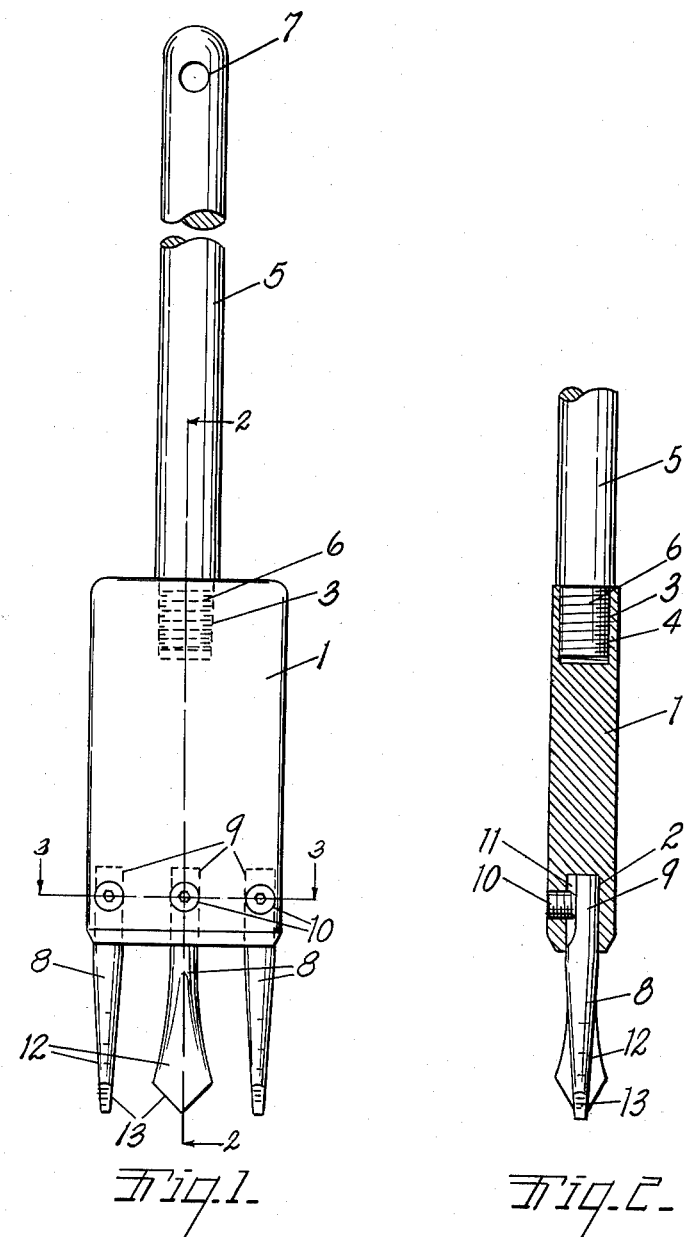
INVENTORS.
Gustave Koscher
Anton Congelliere
BY
ATTORNEY.

United States Patent Office 2,720,023
Patented Oct. 11, 1955

2,720,023

ICE SPUD

Gustave Koscher and Anton Congelliere,
Royal Oak, Mich.

Application December 8, 1952, Serial No. 324,634

5 Claims. (Cl. 30—164.8)

This invention relates to improvements in ice spuds.
The main objects of this invention are:

First, to provide an ice spud which is highly efficient in forming openings in ice and in breaking ice on walks and the like and with the use of which the ice is broken into chips or fragments of substantial size instead of being pulverized or broken into small chips.

Second, to provide an ice spud which enables the very rapid forming of an opening through ice of substantial thickness.

Third, to provide an ice spud having these advantages which is simple and economical in structure and at the same time very strong and durable.

Further objects relating to details and economies of the invention will appear from the description to follow. The invention is defined and pointed out in the claims. A preferred embodiment of the invention is illustrated in the accompanying drawing, in which:

Fig. 1 is a side elevational view of an ice spud embodying our invention, the handle being partially broken away.

Fig. 2 is a fragmentary view partially in longitudinal section on a line corresponding to line 2—2 of Fig. 1.

Fig. 3 is an enlarged transverse section on a line corresponding to line 3—3 of Fig. 1.

The ice spud of our invention comprises an elongated head member 1 of flattened rectangular section, preferably formed of a block of metal. The head member in the embodiment illustrated has three bore-like tool sockets 2 opening at its outer end, these tool sockets being disposed in uniformly and laterally spaced relation to each other.

The head member has a central socket 3 at its inner end internally threaded as indicated at 4 to receive the handle 5 which has a threaded portion 6 threaded into the socket. The handle is preferably formed of a metal rod of uniform cross sectional dimensions and has a transverse bore 7 at its outer end to facilitate the attachment of the rope thereto so that a spud may be retrieved if it should drop through a hole in the ice.

The blades 8 have shank portions 9 fittingly received in the sockets 2 with the ends of the shanks in thrust engagement with the inner ends of the sockets. The shanks may be a drive fit in the sockets but are preferably a close fit in the sockets and retained therein by means of the setscrews 10 engaging flattened side portions of the blades to retain them and prevent rotation of the blades in the socket. The blades 8 have flattened sides 12 and terminate in V-shaped tips 13.

The outer blades are arranged with their flattened sides transversely of the head member as is illustrated and the intermediate blade is disposed with its flattened sides in the plane of the head member and at substantially right angles to the flattened sides of the outer blades. The tips of the blades are in substantially the same plane. This arrangement of the blades results in the ice being broken into fragments or chips of substantial size as distinguished from being substantially pulverized as is the case when ice spuds having single blades are used.

The spud of our invention is particularly desirable for use by fishermen in forming openings in the ice on lakes and rivers and enables the very rapid forming of an opening through ice of substantial thickness. The spud is desirable, however, in chipping or breaking ice from walks and the like.

The head member is in the construction illustrated formed of a block of metal of suitable dimensions and the handle is also desirably of metal. This provides substantial weight and the handle is not likely to be broken even when subjected to severe usage. The blades may be satisfactorily formed of steel rod stock forged to shape the blade and tempered if desired. Should a blade be broken, it may be readily replaced; however, the blades are very effectively supported so that they are not likely to be broken and their shanks are short so that they are not likely to be bent.

We have illustrated and described our invention in a very practical embodiment thereof. We have not attempted to illustrate or describe certain modifications which we contemplate might be made as we believe this disclosure will enable those skilled in the art to embody or adapt our invention as may be desired.

Having thus described our invention, what we claim as new and desire to secure by Letters Patent is:

1. An ice spud comprising an elongated head member of flattened rectangular section having three bore-like laterally and uniformly spaced longitudinally extending blade sockets opening at its outer end, and a centrally disposed threaded handle socket opening at its inner end, flattened blades having opposed flattened approximately parallel sides, V-shaped tips and shanks fittingly seated in said blade sockets, the shanks having flattened side portions, the outer blades being disposed with their flattened sides transversely of the head member and the intermediate blade being disposed with its flattened sides approximately at right angles to the flattened sides of the outer blades, the tips of the blades being substantially in alignment, setscrews on said head member coacting with the flattened portions of the shanks of said blades for nonrotatably securing the blades within said blade sockets, and a handle threaded into said handle socket.

2. An ice spud comprising an elongated head member of flattened rectangular section having three bore-like laterally and uniformly spaced longitudinally extending blade sockets opening at its outer end, and a centrally disposed handle socket opening at its inner end, flattened blades having opposed flattened approximately parallel sides, V-shaped tips and shanks seated in said blade sockets, the outer blades being disposed with their flattened sides transversely of the head member and the intermediate blade being disposed with its flattened sides approximately at right angles to the flattened sides of the outer blades, the tips of the blades being substantially in alignment, and a handle engaged in said handle socket.

3. An ice spud comprising a head member having a plurality of aligned spaced blade sockets opening at its outer end and a handle connected to its inner end, outer and intermediate flattened blades having opposed flattened approximately parallel sides, shanks fittingly seated in said blade sockets, and setscrews on said head member coacting with the shanks of said blades for nonrotatably securing the shanks within the blade sockets, the outer blades being disposed with their flattened sides in parallel relation and the intermediate blade being disposed with its flattened sides in substantially angular relation to the sides of the outer blades.

4. An ice spud comprising a head member having a plurality of aligned spaced blade sockets opening at its outer end and a handle connected to its inner end, and outer and intermediate flattened blades having opposed flattened approximately parallel sides, V-shaped tips and shanks fittingly seated in said blade sockets, the outer blades being disposed with their flattened sides in parallel relation and the intermediate blade being disposed with its flattened sides in substantially angular relation to the sides of the outer blades.

5. An ice spud comprising a head member provided with a handle and a plurality of elongated blades laterally spaced from each other and projecting from the head member in a direction opposite from that of the handle, the blades adjacent their outer ends having widths substantially greater than their thicknesses, the blades being disposed with direction of the width of one blade substantially at right angles to the direction of the width of an adjacent blade, the width dimension of the blades being at a maximum adjacent their outer ends to facilitate clearance for fragments of ice between the blades above their outer ends.

References Cited in the file of this patent

UNITED STATES PATENTS

| | | |
|---|---|---|
| 177,106 | Dernell | May 9, 1876 |
| 348,765 | Neal | Sept. 7, 1886 |
| 561,860 | Bringham | June 9, 1896 |
| 749,665 | Dieterle | Jan. 12, 1904 |
| 766,558 | Wagner | Aug. 2, 1904 |
| 1,550,777 | Bloomfield | Aug. 25, 1925 |
| 1,940,270 | Rainwater | Dec. 19, 1933 |
| 2,546,768 | Mills | Mar. 27, 1951 |